United States Patent [19]

Iwasaki et al.

[11] Patent Number: 5,046,554
[45] Date of Patent: Sep. 10, 1991

[54] COOLING MODULE

[75] Inventors: Masashi Iwasaki, Phoenix; Refki El-Bourini, Chandler; David L. Martin, Phoenix, all of Ariz.

[73] Assignee: Calsonic International, Inc., Irvine, Calif.

[21] Appl. No.: 484,046

[22] Filed: Feb. 22, 1990

[51] Int. Cl.⁵ .............................. F28D 7/16; F01P 7/02
[52] U.S. Cl. ...................................... 165/140; 165/44; 165/127; 123/41.49
[58] Field of Search ................. 165/44, 140, 127, 126, 165/124, 122; 123/41.49

[56] References Cited

U.S. PATENT DOCUMENTS

| | | | |
|---|---|---|---|
| 1,782,394 | 11/1930 | Beimling | 165/140 |
| 1,879,802 | 9/1932 | Harnett | 165/127 |
| 2,655,092 | 10/1953 | Spooner | 165/127 |
| 2,699,323 | 1/1955 | Bergstrom | 165/127 |
| 3,208,964 | 9/1965 | Biabaud | 165/44 |
| 3,229,760 | 1/1966 | Hurter et al. | 165/134.1 |
| 3,621,822 | 11/1971 | Oster | 123/41.49 |
| 3,635,285 | 1/1972 | Davis | 165/122 |
| 3,874,191 | 4/1975 | Hudson | 165/122 |
| 4,059,080 | 11/1977 | Rudert | 165/126 |
| 4,116,269 | 9/1978 | Ikeda | 123/41.49 |
| 4,510,991 | 4/1985 | Kawahira | 165/122 |
| 4,548,548 | 10/1985 | Gray, III | 123/41.49 |
| 4,615,385 | 10/1986 | Saperstein et al. | 165/175 |
| 4,651,816 | 3/1987 | Struss et al. | 165/140 |
| 4,706,615 | 11/1987 | Scadding | 123/41.49 |
| 4,748,943 | 6/1988 | Mayer | 123/41.49 |

FOREIGN PATENT DOCUMENTS

| | | | |
|---|---|---|---|
| 2831022 | 1/1980 | Fed. Rep. of Germany | 165/140 |
| 568295 | 3/1945 | United Kingdom | 165/140 |
| 2113819 | 8/1983 | United Kingdom | 165/140 |

Primary Examiner—John Rivell
Assistant Examiner—L. R. Leo
Attorney, Agent, or Firm—Don J. Flickinger; Jordan M. Meschkow

[57] ABSTRACT

Each of a pair of heat exchangers, such as a radiator and a condenser, includes a tubular structure defining a fluid flow path between an inlet manifold and an outlet manifold. The heat exchangers reside in juxtaposition for a unit with the respective fluid flow paths being congruently aligned along the axis of a stream of cooling medium passing therethrough. The heat exchangers are sealingly encased within a shroud for directing the stream of cooling medium through the tubular structures. The shroud, which is alternately usable with a conventional radiator, and the heat exchanger units are installed in a motor vehicle as a pre-fabricated modular cooling unit.

2 Claims, 3 Drawing Sheets

COOLING MODULE

BACKGROUND OF THE INVENTION

1. Field of the Invention

This invention relates to devices for the transfer of heat from one medium to another.

More particularly, the present invention relates to devices of the type commonly referred to as heat exchangers and especially adapted for the transfer of heat from a circulating fluid to a stream of cooling medium.

In a further and particular aspect, the instant invention concerns improvements in devices of the foregoing type.

2. Prior Art

The prior art is replete with numerous devices for the transfer of heat from one medium to another. Commonly referred to as heat exchangers, the devices are available in an assortment of sizes and structural configurations for specific applications.

Exemplary are heat exchangers especially adapted for the cooling of various fluids. Typically, a heat exchanger is placed in series with a fluid circulation system for circulating the fluid through a stream of cooling medium. Such devices commonly include an inlet manifold for receiving the fluid from the system and an outlet manifold for returning the fluid to the system. Intermediate the inlet manifold and the outlet manifold, the fluid flows through a conduit structure, usually called a core, which intercepts the stream of cooling medium. Several types of conduit structures, usually incorporating tubes of relatively small cross-section, are well known.

In accordance with one popular configuration a plurality of parallel tubes communicate between spaced apart manifolds. Tubular forms defining a circuitous or serpentine fluid flow path are also familiar.

Heat exchanges of the foregoing type are regularly used in connection with motor vehicles. The conventional motor vehicle is generally powered by an internal combustion engine which is cooled by a liquid circulation system including a heat exchanger. The refrigerant fluid in the air conditioning system is also circulated through a heat exchanger. Heat exchangers are also employed to cool other vehicular fluids including engine oil and transmission fluid.

When utilized for the cooling of a liquid, such as in the cooling system of an internal combustion engine, the heat exchanger is commonly termed a radiator. A heat exchanger incorporated into a system having a compressible gas, i.e. an air conditioning unit, is usually referred to as a condenser. In vehicular applications the inlet and outlet manifolds are known as headers or tanks. Depending upon orientation of the headers, a radiator or condenser is designated as down flow, in which the inflow header resides above the outflow header, or cross-flow, in which the headers are separated horizontally.

In traditional vehicular construction, the radiator is secured to a frame cross member immediately forward of the engine and behind a frontal opening or grille in the body. Ambient air, functioning as the cooling medium, enters through the opening in the body and passes as a stream through the radiator. Movement of the stream is assisted by a far located rearwardly of the radiator. Frequently, a shroud usually in the shape of a frustum of a cone or pyramid is positioned intermediate the radiator and the fan.

For vehicles equipped with air conditioning, a condenser is affixed to the front side of the radiator. Ancillary coolers, heat exchangers for engine oil, transmission fluid and other fluid systems, may be superimposed upon the condenser.

The prior art, conventional radiators and condensers and the installation thereof, has proven to be less than satisfactory. Especially noticed is the casual control of the cooling medium. A substantial portion of the critical and vital need air entering through the grille of a vehicle is free to flow along the path of least resistance, around instead of through the assembled heat exchangers. Further ineffectiveness is attributed to imprecise cooperation between the radiator and the attached shroud and between the shroud and the fan.

Another serious shortcoming is the random attachment of the condenser to the radiator. Generally, no provisions are made to align the core of one with the core of the other. Accordingly, a tubular member of one core frequently interrupts air flow between the tubular members of the other core. The resulting decrease in circulation of the cooling medium can be overcome only partially by increasing the volume of the fan at the expense of additional energy input.

In addition to the inadequacies of function, the manufacture and installation of radiators and condensers are exceedingly expensive and laborious. Each is independently manufactured to singular specifications. During assembly of the vehicle separate operations are required for installation. The find cost and weight of the vehicle in increased accordingly.

Environmental concerns dictate increased efficiency of motor vehicles. Efficiency is also desirable for economic reasons. Traditional heat exchanger technology has been a major deterrent to the achievement of the foregoing goals.

It would be highly advantageous, therefore, to remedy the foregoing and other deficiencies inherent in the prior art.

Accordingly, it is an object of this invention to provide improvements in heat exchangers.

Another object of the invention is the provision of improvements in the cooling efficiency of heat exchangers.

And another object of this invention is to provide ameliorated means for directing a stream of cooling medium through a heat exchanger.

Still another object of this invention is the provision of an improved assembly comprising two or more superimposed heat exchangers.

Yet another object of the instant invention is to provide improvements in heat exchangers, such as radiators and condensers, which are especially adapted for vehicular application.

Yet still another object of the invention is the provision of means to expedite the installation of a radiator and a condenser during the assembly of a motor vehicle.

A further object of the immediate invention is to provide a self-contained cooling module for use in combination with the several fluid circulation systems of a motor vehicle.

And a further object of the invention is the provision of an integrated radiator and condenser unit of simplified design and materially reduced cost.

Yet a further object of the invention is to provide cooling means which substantially reduce the energy requirements associated with operating a motor vehicle.

And yet a further object of the invention is the provision of improvements according to the foregoing which are simply and economically practiced with known materials and skills.

SUMMARY OF THE INVENTION

Briefly, to achieve the objects of the instant invention in accordance with a preferred embodiment thereof, first provided is a heat transfer device for placement in a stream of cooling medium and for simultaneously cooling a first circulating fluid and a second circulating fluid. A preferred heat transfer device includes first inlet means for receiving the first fluid and first outlet means for emitting the first fluid. First fluid transmission means communicates between the first fluid means and the first outlet means for flow of the first fluid along a path of selected configuration. Further included is a second inlet means for receiving the second fluid and second outlet means for emitting the second fluid. Second fluid transmission means communicate between the second inlet means and the second outlet means for flow of the second fluid therethrough along a second path which is aligned with the first path along an axis which is substantially parallel to the flow of the stream of the cooling medium.

More particularly, the configuration of the path defined by the second fluid transmission means is congruent with the configuration of the path defined by the first fluid transmission means. In accordance with a specific embodiment, the first fluid transmission means includes a conduit defining a portion of the path of the first fluid and a second like conduit defining another portion of the path of the first fluid. The second fluid transmission means similarly includes a third like conduit defining a portion of the path of the second fluid and a fourth like conduit defining another portion of the path of the second fluid. The first and the third conduits may extend along parallel axis which line in a plane which is substantially parallel to the axis of the stream of cooling medium and the second and fourth conduits may extend along parallel axis which lie in a second plane which is substantially parallel to the axis of the stream of cooling medium.

Next provided is a shroud for use in combination with a heat exchanger and for improved control of a cooling medium for flow through the heat exchanger. In a preferred embodiment, the shroud includes an end wall having an end opening therein and a continuous sidewall extending from the end wall for encasing the heat exchanger and having an open end. Further included are circulation means for moving the cooling medium through the shroud, the medium entering through the open end of the sidewall and being discharged through the opening in the end wall. The shroud may further include locational means for locationally positioning the heat exchanger within the shroud. Preferably, the locational means include an inwardly directed shoulder for receiving the heat exchanger thereagainst. Preferably, the heat exchanger is sealingly secured to the shroud for inhibiting flow of the cooling medium therebetween.

In accordance with a preferred embodiment, the circulation means includes first means, such as an impeller, for causing movement of the cooling medium and second means, such as a duct communicating with the opening in the end wall for directionally controlling the medium being discharged. The impeller may reside within the duct.

In a more specific embodiment, a second opening, spaced from the first opening, is formed in the end wall for discharge of cooling medium in response to the circulation means. The immediate embodiment further includes a second duct and a second impeller cooperating with the second opening in the end wall.

Further provided by the instant invention is a unitary cooling module including a shroud substantially as described above. Carried by the shroud is a conventional prior art heat exchanger for cooling a single fluid or, alternately, a heat transfer device substantially as previously described for simultaneously cooling a first fluid and a second fluid.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which.

DETAILED DESCRIPTION OF THE PREFERRED EMBODIMENTS

Figures 1, 2:
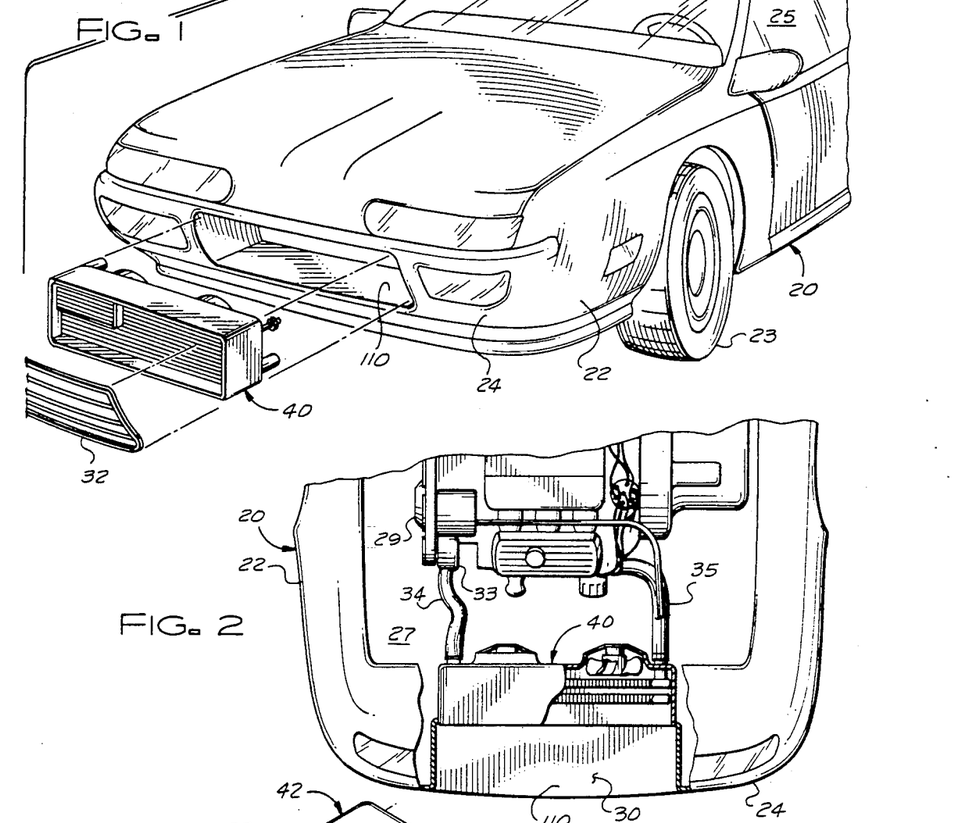
FIG. 1 is an exploded perspective view showing a fragmentary frontal portion of a conventional motor vehicle and a cooling module constructed in accordance with the teachings of the instant invention and especially adapted for use in connection with the vehicle.
FIG. 2 is a top plan view of the motor vehicle of FIG. 1 having the cooling module of the instant invention installed therein, portions of the vehicle and of the cooling module being broken away for purposes of illustration.

Turning now to the drawings in which like reference characters indicate corresponding elements throughout the several views, attention is first directed to FIG. 1 which illustrates a passenger vehicle, generally designated by the reference character 20, having a body 22 supported by a chassis as represented by wheel 23. Located within the frontal portion of body 22, intermediate front end 24 and passenger compartment 25, is engine compartment 27 as seen with additional reference to FIG. 2. An openable hood, removed for purposes of illustration in FIG. 2, extends over engine compartment 27. Internal combustion engine 29 resides within engine compartment 27. Opening 30, formed in front end 24 and normally having decorative grille 32 extending thereacross, allows for the flow of ambient air into engine compartment 27.

Typically, internal combustion engine 29 is cooled by a liquid cooling system. Although not specifically illustrated but as will be appreciated by those skilled in the art, the liquid cooling system includes a arcuitous flow path or cooling jacket extending within engine 29. The liquid is circulated by pump 33 which receives the liquid coolant through inlet hose 34. After passage through the engine, the liquid coolant is discharged through outlet hose 35. In accordance with conventional practice, a heat exchanger, normally referred to as a radiator, resides intermediate hoses 34 and 35. Additional exemplary fluid circulation systems conventionally incorporated into a passenger vehicle are associated with the engine oil, the transmission fluid and the air conditioning system.

The foregoing brief description of passenger vehicle 20 is set forth for purposes of orientation and reference in connection with the ensuing detailed description of preferred embodiments of the instant invention. The description of passenger vehicle 20 is intended to be typically representative of vehicles in general and also of internal combustion engines and other devices having a fluid circulation system. Further and more specific details not specifically illustrated will be readily appreciated and understood by those having a regard for the instant subject matter.

Illustrated in connection with vehicle 20 is a cooling module constructed in accordance with the teachings of the instant invention and generally designated by the reference character 40. As illustrated in greater detail in FIG. 3, cooling module 40 includes a shroud generally designated by the reference character 42 and first and second heat exchangers generally designated by the reference characters 43 and 44. For purposes of discussion, first heat exchanger 43 functions as a radiator in connection with the liquid circulation system of engine 29. Similarly, second heat exchanger 44 functions as a condenser for use in combination with an air conditioning system. Also shown is a third heat exchanger 45 which is representative of the typical coolers used for engine oil and transmission fluid. First heat exchanger 43 and second heat exchanger 44 and, optionally, third heat exchanger 45, function as an integrated heat transfer device for simultaneously cooling at least a first fluid and a second fluid. Shroud 42 controls the flow of a cooling medium, in the immediate case air, through the heat transfer device. In accordance with the teachings of the instant invention, shroud 42 also cooperates with body 22. Details of the structure and of the function of the components of the module will become apparent as the description proceeds.

Figures 4, 5, 6, 7, 8, 9:
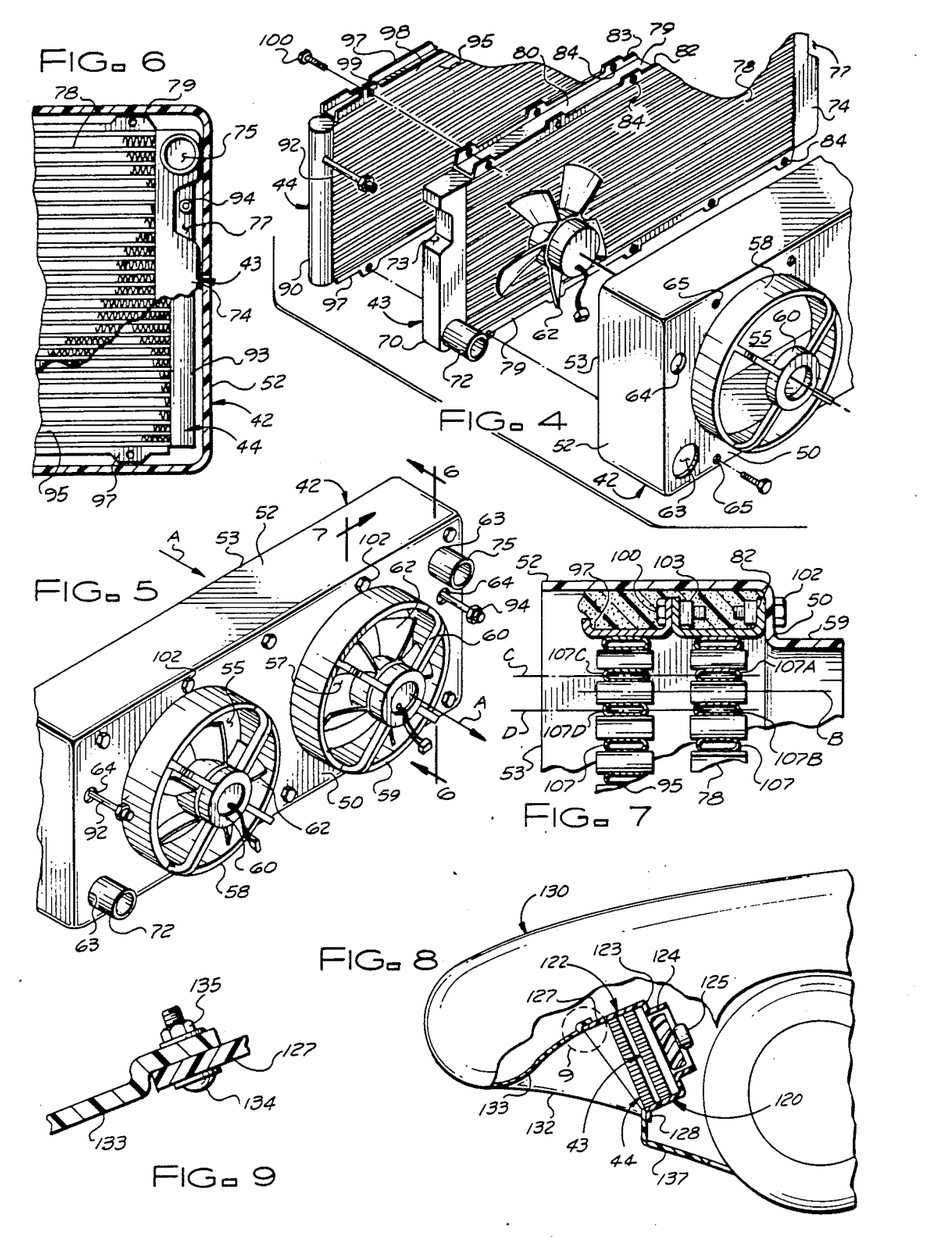
FIG. 4 is an enlarged exploded fragmentary perspective view taken from the discharge side of the cooling module of FIG. 1.
FIG. 5 is a view generally corresponding to the view of FIG. 4 and showing the cooling module thereof as it would appear when assembled.
FIG. 6 is an enlarged fragmentary vertical sectional view taken along the line 6—6 of FIG. 5.
FIG. 7 is an enlarged fragmentary vertical sectional view taken along line 7—7 of FIG. 5.
FIG. 8 is a side elevational view of a motor vehicle having a portion thereof broken way to reveal an alternate cooling module incorporating the principles of the instant invention and being shown in vertical sectional view.
FIG. 9 is an enlarged sectional view taken from within the broken outline circle designated 9 in FIG. 8

Shroud 42, further illustrated in FIGS. 4 and 5, includes end wall 50 having continuous sidewall 52 extending therefrom and terminating with edge 53 defining open end 54. A pair of spaced apart openings 55 and 57 extend through end wall 50. Ducts 58 and 59 communicating with the openings 55 and 57, respectively, extend from end wall 50. A spider-type mounting bracket 60 carried by each duct 58 and 59 functions as a support for attachment of a respective fan motor 62.

Several apertures extend through end wall 50. A first pair of apertures 63 and a second pair of apertures 64 are arranged such that one of each pair lies outboard of the respective ducts 58 and 59. A plurality of apertures 65 are arranged into two spaced apart rows extending laterally of end wall 50. Further description of the several apertures will be made presently.

Preferably, shroud 42 is integrally fabricated of a molded thermoplastic resin such as glass reinforced polypropylene. Other structures of known materials fabricated in accordance with standard techniques will readily occur to those skilled in the art. For purposes of orientation and reference but not limitation, edge 53 is considered the inlet end of shroud 42 while end wall 50 is considered the discharge end thereof. Accordingly, ducts 58 and 59 cooperate with the respective fan motors 62 for moving a stream of cooling medium through shroud 42 as indicated by the arrowed lines A in FIG. 5.

Figure 3:
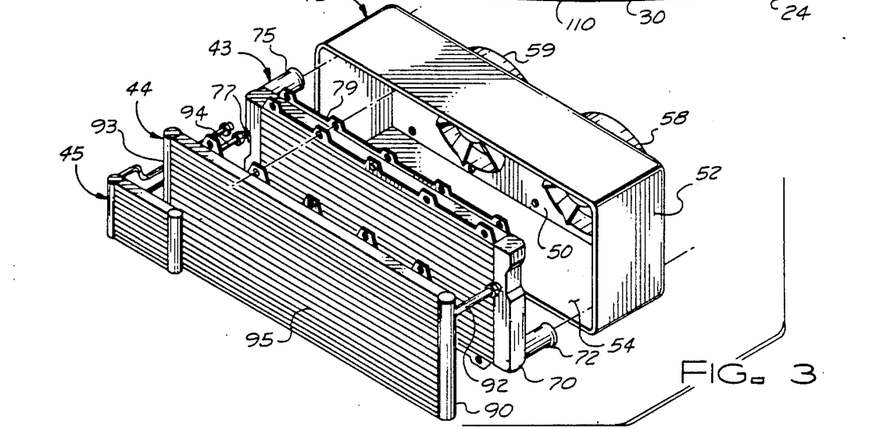
FIG. 3 is an enlarged exploded perspective view taken from the inlet side of the cooling module of FIG. 1.

With particular reference to FIGS. 3 and 4, it is seen that first heat exchanger 43 includes an inlet manifold 70 having rearwardly projecting tubular member 72. Recess 73 is formed in inlet manifold 70. Outlet manifold 74, spaced from inlet manifold 70, similarly includes rearwardly extending tubular member 75 and recess 77. Fluid transmission means 78, of which further description will be made presently, communicates between inlet manifold 70 and outlet manifold 74.

A pair of identical reinforcement members 79 extend between the inlet manifold 70 and the outlet manifold 74 outboard of the fluid transmission means 78. Being generally U-shaped in cross section, each reinforcement member 79 includes a central section 80 from which extend flanges 82 and 83. A plurality of spaced apart apertures 84 extend through each flange 82 and 83.

Second heat exchanger 44, in general similarity to first heat exchanger 43, includes inlet manifold 90 having rearwardly projecting tubular member 92 and outlet manifold 93 with rearwardly projecting tubular member 94. Fluid transmission means 95 communicates between inlet manifold 90 and outlet manifold 93. Reinforcement members 97, each having projecting flange 98 with a plurality of spaced apart apertures 99 therethrough, extend between inlet manifold 90 and outlet manifold 93 outboard of the fluid transmission means 95.

A detailed description of the fluid transmission means 78 of first heat exchanger 43 and of the fluid transmission means 95 of second heat exchanger 44 will be made presently.

First heat exchanger 43 is assembled with second heat exchanger 44 to provide an immediately preferred embodiment of a heat transfer device by several bolts 100 which extend through respective apertures 99 and 84. In the assembled configuration, second heat exchanger 44 is superimposed upon first heat exchanger 43 in a pre-determined aligned relationship. Tubular member 94 of second heat exchanger 44 extends through the recess 77 in first heat exchanger 43. Similarly, although not specifically herein illustrated, tubular member 92 extends through the recess 73. Accordingly, second heat exchanger 44 resides within the perimeter defined by first heat exchanger 43. The heat transfer device is sized to be received within the sidewall 52 of shroud 42 and secured thereto by several bolts 102 extending through respective openings 65 in end wall 50 and apertures 84 in the flanges 82 of reinforcement members 79. With momentary reference to FIG. 5, it is seen that the several tubular members extend unidirectionally through respective openings in end wall 50.

As specifically seen in FIG. 7, the peripheral portion of end wall 50 functions as a shoulder for receiving the flanges 82 of reinforcement members 79 thereagainst. Preferably, as seen with further reference to FIG. 6, sidewall 50 is sized and shaped to closely receive the assembled heat exchangers. Accordingly, the heat transfer device is locationally received within the shroud. A continuous seal 103, encasing the perimeter of the heat transfer device and engaging the interior surface of the sidewall, prohibits flow of the cooling medium therebetween and further directs that all cooling medium passing through the shroud must pass through the fluid transmission means 78 and 95. In accordance with the immediately preferred embodiment of the invention, seal 103 is formed by a foamed-in-place plastic.

The fluid transmission means 78 and 95 will now be described in detail with particular reference to FIGS. 6 and 7. In accordance with the immediately preferred embodiment of the invention, the fluid transmission means 78 and 95 include a plurality of identical conduits 107. A first plurality 107 extend in spaced apart parallel relationship between the manifold 70 and 74. Similarly, a second plurality of spaced apart parallel conduits 107 extend between the manifolds 90 and 93. The several conduits of each heat exchanger define a path for flow of fluid from the respective inlet manifold to the respective outlet manifold. It is preferred that each conduit 107 extend along a longitudinal axis which is substantially perpendicular to the movement of the stream of cooling medium. It is also preferred, for maximum flow of the stream of cooling medium that the fluid flow path defined by one of the fluid transmission means be congruent and aligned with the fluid flow path defined by the other of the fluid transmission means.

Further explanation is made with reference to FIG. 7 wherein, for reference, a pair of adjacent conduits 107, of fluid transmission means 78 are designated 107a and 107b and a corresponding adjacent pair of conduits 107 of fluid transmission means 95 are designated 107c and 107d. Cooling medium passing through the module moves in the direction of arrowed line A along an axis represented by the broken line B. The conduits 107a and 107c extend along parallel longitudinal axes which lie in a plane containing the axes represented by the broken line C. Similarly, the conduit 107b and the conduit 107d extend along parallel longitudinal axes which lie in a plane also including the axes represented by the broken line D. The axis designated C and D are parallel to the axis designated B. Within the limits of practical manufacture, the several conduits share a common height and each pair is spaced apart a common distance. Accordingly, a portion of the stream of cooling medium flowing parallel to the axis B in the direction of arrowed line A will move uninterruptedly between each aligned pair of conduits. A corrugated fin structure for increasing the surface area available for heat dissipation in accordance with conventional practice, resides intermediate each pair of conduits 107.

Preferably, cooling module 40 is installed into vehicle 20 as a prefabricated unit. Consistent with the teachings of the instant invention, it is preferred that all air entering through the opening in the front of the vehicle be directed to the shroud 42 for passage through the heat exchangers residing therein. Exemplary is the duct 110, seen in FIGS. 1 and 2, which is sized to closely receive the forward terminal portion of the sidewall 52. It will also be appreciated that the duct 110 may function as the mounting bracket for the cooling module 40 with the attachment between shroud 42 and duct 110 being made in accordance with conventional practice.

A prototype cooling module substantially as described above was constructed and tested. The device was especially devised for passenger vehicle application. A first heat exchanger functioned as a radiator for use in connection with cooling the internal combustion engine. The second heat exchanger functioned as a condenser in connection with the air conditioning system for changing the gaseous or vaporous refrigerant into a liquid. It is noted that in connection with automotive uses, the manifolds are generally referred to as headers or tanks. The fluid transmission means extending between headers is commonly referred to as a core.

The experimental radiator and the experimental condenser were constructed as weldments of aluminum elements. Each incorporated identical aluminum conduits having a wall thickness of 0.3mm, a height of 2.0mm and a width of 14.5mm. Each adjacent pair of conduits was spaced apart a distance of 9.0mm. Intermediate each adjacent pair of conduits was a corrugated fin fabricated from material having a thickness of approximately 0.18mm and a width to extend approximately 2.0mm in each direction from the conduits. The fins associated with 22 the radiator are corrugated to have a pitch of approximately 22 per inch while the condenser had a pitch of approximately 15 per inch. The condenser was superimposed upon the radiator with the respective conduits residing approximately 15.0mm apart.

When compared with the conventional prior art radiator and condenser for use in the same application, the prototype was approximately 30% smaller and weighed approximately 40% less. It was noted that the device was substantially more efficient than the prior art, having a power consumption reduced by approximately 40%. A substantial portion of the savings in power consumption was directly attributed to the lesser energy requirement of the fan motors. It was also noted that the volume of refrigerant carried within the air conditioning system could be reduced by approximately 11%.

Heat exchangers 43 and 44 have been described as having a plurality of straight parallel conduits extending between a pair of vertically extending manifolds which are spaced apart horizontally. The prototype described above was similarly constructed. Radiators and condensers generally of the described configuration are commonly referred to as cross-flow.

Various other types of heat exchangers are known. Exemplary is the down flow configuration in which the manifolds extend horizontally and are spaced apart vertically. Straight and circuitous fluid flow paths are also known. As will be appreciated by those skilled in the art, the foregoing is set forth by way of example only and the teachings thereof are readily adaptable to other and varied heat exchangers configurations.

It is also within the context of the teachings that the heat transfer device may include more than the exemplary two heat exchangers. Noted is the additional heat exchanger designated 45 which is similarly constructed and secured to heat exchangers 43 and 44 in alignment therewith.

Attention is now directed to FIG. 8 wherein there is seen an alternate cooling module generally designated by the reference character 120 including shroud 122 which, in general similarity to the previously described shroud, includes end wall 123 from which projects duct 124 carrying fan motor 125. Continuous sidewall 127 projecting from end wall 123 encases previously described heat exchangers 43 and 44. Sidewall 127 differs from the previously described sidewall by the flange 128 which extends along the lower portion thereof. At the upper portion, sidewall 127 is extended such that the vertical portions are angularly disposed to extend upwardly outward. In all other aspects not specifically illustrated nor described, attention is directed to the previously described embodiment of the invention.

Also contemplated by the immediate embodiment of the invention is a motor vehicle generally designated by the reference character 130 a reduced frontal area, specifically a lowered hood line. Vehicle 130 includes a frontal opening 132 defined by duct 133 to which is secured cooling module 120. Sidewall 127 is readily secured to duct 133 in accordance with any conventional technique such as the use of a conventional bolt 134 and nut 135 as seen in FIG. 9. In contrast to the conventional configuration, opening 132 is directed downwardly to receive air normally passing under the vehicle. The preferred angle between the opening 132 and horizontal when viewed laterally as in FIG. 8, is less than 45°. Air dam 137 secured to and extending downwardly rearward from flange 128 prevents heated air being discharged through duct 124 from recirculating into opening 132. Although seen in cross section, it will be appreciated that air dam 137 is elongate extending laterally of the vehicle.

Figures 10, 11, 12:
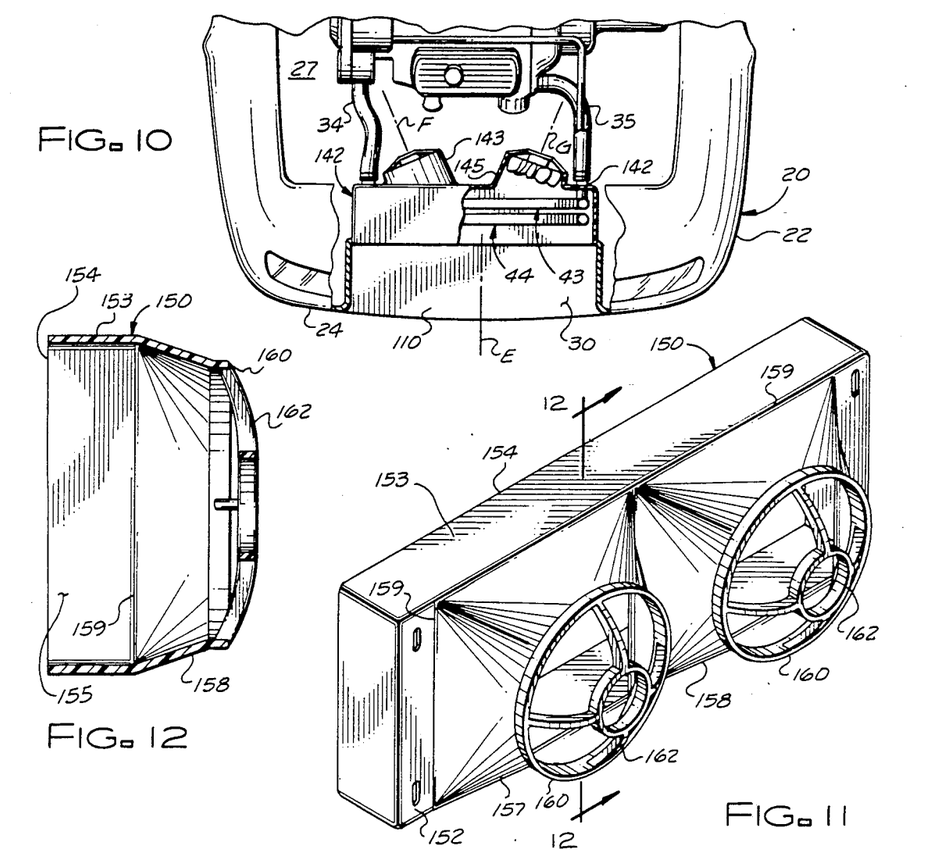
FIG. 10 is a view generally corresponding to the view of FIG. 2 and showing an alternate embodiment of the invention.
FIG. 11 is a perspective view of a shroud incorporating the teachings of the instant invention as it would appear when viewed from the discharge side.
FIG. 12 is a vertical sectional view taken along the line 12—12 of FIG. 11.

Referring now to FIG. 10 there is seen an alternate shroud, generally designated by the reference character 140 usable in combination with heat exchangers 43 and 44 as previously described. In further similarity to the previously described embodiments, shroud 140 includes end wall 142 and sidewall 143. Sidewall 143 is subject to alternate forms for use with vehicle 20 as illustrated or, as will be appreciated by those skilled in the art, vehicle 130.

A pair of spaced apart ducts 144 and 145, each supporting a fan motor 62 and for purposes previously described, project rearwardly from end wall 142. Ducts 144 and 145 are divergent, each projecting rearwardly outward from end wall 142. Air passing through duct 110 and sidewall 143 flows in a stream along an axis which is substantially parallel to the broken line designated E. Discharge air is directed by the ducts 144 and 145 to flow along axes represented by the broken lines F and G, respectively. Preferably, the axis F and G form an angle of approximately 10° with the axis E. Accordingly, discharge air is directed to flow around engine 29 thereby significantly decreasing back pressure and enhance flow of the cooling medium through the heat exchangers 43 and 44.

Illustrated in FIGS. 11 and 12 is an alternate shroud, generally designated by the reference character 150, constructed in accordance with the teachings of the instant invention and including end wall 152 from which projects continuous sidewall 153 terminating with edge 154 defining inlet opening 155. Shroud 150 is usable with heat exchangers 43 and 44 as previously described, In general similarity to the previously described embodiments, a pair of ducts 157 and 158 project from end wall 152. Each duct 157 and 158 may be characterized as being generally in the shape of a frustum which is transitional between a generally rectangular base and a somewhat smaller circular end 160. Base 159 is coincident with end wall 152 and forms an opening therein. End 160 encircles and shrouds a fan motor, such as previously described fan motor 62. A spider-type mounting bracket 162, spanning the opening defined by each end 160 supports a fan motor. It is noted that each duct 157 and 158 lies along an axis which is substantially parallel to the movement of the stream of cooling medium through the shroud.

Figure 13:
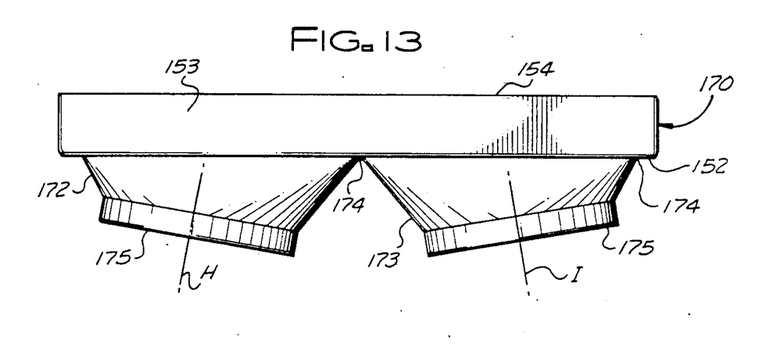
FIG. 13 is a top plan view of an alternate embodiment of a shroud embodying the principles of the instant invention.

FIG. 13 illustrates yet another shroud of the instant invention generally designated by the reference character 170. A modification of previously described shroud 150, shroud 170 commonly shares end wall 152 and sidewall 15 terminating with edge 154. In further similarity, a pair of frustum like ducts 172 and 173 project from end wall 15. Each duct 172 and 173 forms a transition between a generally rectangular base 174 and a generally circular open end 175. In contrast to the previously described ducts 157 and !58, the immediate ducts 172 and 173 are skewed to extend from end wall 152 along divergent axes herein represented by the broken lines H and I, for purposes previously explained in connection with the description of FIG. 10.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear add concise terms as to enable those skilled in the art to understand and practice the same.

The invention claimed is:

1. A heat transfer device for placement in a stream of cooling medium and for simultaneously cooling a first circulating fluid and a second circulating fluid, said unit comprising:
   a) a first heat exchanger including
      i) first inlet means for receiving said first fluid;
      ii) first outlet means for emitting said first fluid; and
      iii) a first plurality of conduits communicating between said first inlet means and said first outlet means for conducting said first fluid along a first path of selected configuration, each of said conduits having a predetermined cross-sectional area;
   b) a second heat exchanger including
      i) second inlet means for receiving said second fluid;
      ii) second outlet means for emitting said second fluid; and
      iii) a second plurality of conduits communicating between said second inlet means and said second outlet means for conducting said second fluid along a second path of selected configuration, each of said conduits having a cross-sectional area equal to the cross-sectional area of the conduits in said first heat exchanger; and c) alignment means for detachably securing said second heat exchanger to said first heat exchanger in a predetermined superimposed relationship such that each of said conduits in said first plurality extends along an axis which is parallel to an axis extending through a corresponding conduit in said second plurality, said axes lying in a plane substantially parallel to the axis of said stream of cooling medium, wherein said alignment means includes
  i) a first tubular member projecting from said first inlet means;
  ii) a second tubular member projecting from said first outlet means in a common direction with said first tubular member;
  iii) a third tubular member projecting from said second inlet means in said common direction;
  iv) a fourth tubular member projecting from said second outlet means in said common direction;
  v) a first recess in one of said first inlet means and said second inlet means for removably receiving one of said first tubular member and said third tubular member; and
  vi) a second recess in one of said first outlet means and said second outlet means for removably receiving one of said second tubular member and said fourth tubular member.

2. The heat transfer device of claim 1, wherein said alignment means further comprises means for locating said device in a predetermined position within a shroud.

* * * * *

UNITED STATES PATENT AND TRADEMARK OFFICE
CERTIFICATE OF CORRECTION

PATENT NO. : 5,046,554
DATED : September 10, 1991
INVENTOR(S) : Masashi Iwasaki, Refki El-Bourini and David L. Martin It is certified that error appears in the above-identified patent and that said Letters Patent is hereby corrected as shown below:

In the drawings:

Figure 10, delete numeral "142" located at the bold arrow on the left side of the shroud, and insert --140--;

delete numeral "143" located at the left duct above the shroud, and insert --144--;

insert an arrow labelled as --143-- at the right side of the shroud below "end wall 142".

Signed and Sealed this

Nineteenth Day of January, 1993

Attest:

DOUGLAS B. COMER

*Attesting Officer*  *Acting Commissioner of Patents and Trademarks*